United States Patent [19]

Switall

[11] 4,289,167

[45] Sep. 15, 1981

[54] NON-DRIP FLUID DELIVERY SYSTEM

[75] Inventor: Thomas G. Switall, Wheeling, Ill.

[73] Assignee: Ryco Graphic Manufacturing, Inc., Wheeling, Ill.

[21] Appl. No.: 180,858

[22] Filed: Aug. 25, 1980

Related U.S. Application Data

[63] Continuation of Ser. No. 955,977, Oct. 30, 1978, abandoned.

[51] Int. Cl.³ .............................................. F16K 11/04

[52] U.S. Cl. .................................... 137/869; 101/148; 137/871; 239/562

[58] Field of Search ........................ 137/595, 869, 871; 101/148; 239/551, 562

[56] References Cited

U.S. PATENT DOCUMENTS 4,213,481 7/1980 Benjamin .................. 137/DIG. 8 X

*Primary Examiner*—Gerald A. Michalsky

*Attorney, Agent, or Firm*—Lee, Smith & Jager

[57] ABSTRACT

The disclosed delivery system delivers a supply of fluid under pressure through a plurality of outlet lines simultaneously at desired intervals. The system enables controlled, intermittent fluid flow without drippage, as needed in the application of dampening fluid to the ink roll or offset plate on the plate cylinder of an offset printing press or in the application of solvent in a blanket cylinder washing system. A single valve provides fluid flow control by utilizing a single piston to simultaneously open and close all flow lines.

2 Claims, 6 Drawing Figures

NON-DRIP FLUID DELIVERY SYSTEM

This is a continuation, of application Ser. No. 955,977, filed Oct. 30, 1978, now abandoned.

BACKGROUND OF THE INVENTION

1. Field of the Invention

The invention relates to an improved fluid delivery system where quick, effective flow interruption is critical, and is particularly directed to a system for more accurately controlling the amount of dampening fluid delivered to the plate cylinder of an offset printing press for improvement of print quality.

2. Description of the Prior Art

In the offset printing press, a small amount of a dampening solution, i.e., water with certain additives, is supplied to the offset plate carried on a plate cylinder, which then comes in contact with the inking rollers, the ink adhering to the image on the plate and the dampening solution adhering to the other portions of the plate. The quantity and placement of the dampening solution must be varied for different types and densities of ink, variations in printing densities and coverages, and press speeds. Control of the application of the dampening fluid is particularly important in four-color processes, where variations will affect color. If too little fluid is applied, printing will occur in areas where none is desired. If too much fluid is applied, printing may not occur in some areas, and scumming may also occur.

Over the years, a number of systems have been developed which are directed to the problem of accurately controlling the flow of the dampening solution onto the offset plate. For example, my previously issued U.S. Pat. No. 4,064,801, assigned to the present assignee, discloses a system which keeps the fluid supply under pressure without employing a liquid pump, whereby the amount of air drawn into the fluid supply is minimized and, hence, the formation of small air bubbles which interfere with the pumping action and cause imprecise application of the dampening fluid is eliminated. My previously issued U.S. Pat. No. 3,508,711, also assigned to the present assignee, teaches the use of a single fluid control unit to supply fluid at determined intervals through a single line to a spray head manifold having a plurality of spray nozzles which are individually operated in response to fluid pressure. U.S. Pat. No. 3,949,668, issued to R. Smith, discloses means for minimizing drippage subsequent to shutoff by utilizing a separate piston for each outlet line and accompanying spray nozzle. Each of these patents is fully incorporated by reference in this disclosure.

SUMMARY OF THE INVENTION

The present invention combines the teachings of the prior art with a unique non-drip fluid delivery system comprising a valve having a single piston for effectively initiating and interrupting fluid flow to a plurality of outlet lines simultaneously without drippage after shutoff. The present system utilizes a fluid supply which is segregated from any air source, the fluid valve being employed in the fluid delivery system for preventing fluid drippage out of the outlet lines after fluid flow has been interrupted by the single piston of the valve.

In the preferred embodiment of the invention, the movement of the piston which controls fluid delivery is determined by a single valve plunger operated by air pressure. The valve plunger may, of course, be operated by other means such as a solenoid or the like. When the valve piston is in the open position the fluid supply reaches the outlet lines through the piston channels in the valve piston. Thus, the valve piston and the valve cylinder in which the piston operates form part of the delivery system for the fluid as it flows from the supply inlet through the valve and to the outlet lines.

By integrating the valve means directly into the path of fluid flow, a simplified construction is provided. The present invention utilizes fewer moving parts than systems of the prior art while ensuring simultaneous operation of all outlet lines. In addition, the present system combines the means of fluid interruption and drippage prevention through the employment of a single piston. Further, the unique fluid delivery system of the invention virtually eliminates dripping from the outlet lines subsequent to fluid flow interruption, providing a system for accurately applying fluid additives to the plates of offset printing presses and for other applications where accurate control of fluid flow is required.

DETAILED DESCRIPTION OF THE INVENTION

In the preferred embodiment of the non-drip fluid delivery system of the present invention, the fluid valve 20 includes a single fluid inlet tube fitting 24 in communication with a supply of fluid under pressure, and a plurality of outlet lines 22 for distributing the fluid, as shown in FIGS. 1-6.

Figure 1:
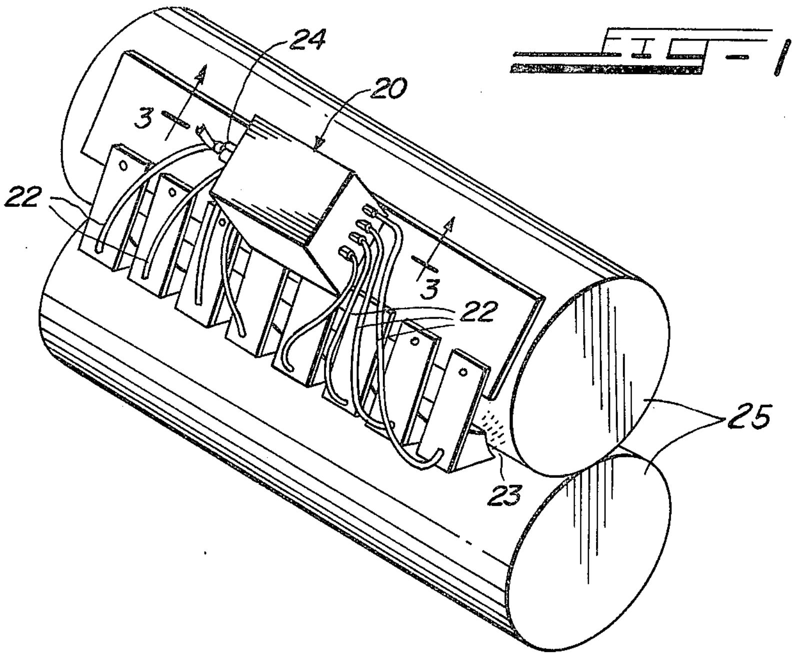
FIG. 1 is a perspective view of two dampening rolls of an offset printing press with the non-drip fluid delivery system of the present invention.

Referring specifically to FIG. 1, the fluid valve 20 is shown in use in a spray dampening system for an offset printing press. The dampening fluid is sprayed from the individual spraying nozzles 23 onto the dampening rolls 25. The dampening rolls 25 transfer the dampening solution to the offset plate on the plate cylinder (not shown). Precise control of the amount of dampening solution applied to the offset plate can be accomplished by controlling the amount of dampening fluid on the dampening rolls 25.

A more detailed illustration of an offset printing press is shown in my U.S. Pat. No. 4,064,801. The present invention may also be employed to deliver a cleaning solvent to the blanket cylinders of an offset printing press in order to clean those cylinders, as shown in my U.S. Pat. No. 3,508,711.

In the illustrated embodiment each outlet line 22 of the delivery system is connected to an individual spraying nozzle 23. The fluid to be delivered to the plurality of outlet lines 22 enters the fluid valve 20 through the fluid inlet tube fitting 24. The fluid is continuously urged into the fluid valve 20 by maintaining the fluid supply under pressure. A fluid pump could be utilized for this purpose. However, it has been found that it is desirable to utilize a fluid supply under pressure, without the use of a fluid pump, thereby minimizing the introduction of air bubbles into the fluid, as disclosed in my previously issued U.S. Pat. No. 4,064,801.

Figure 3:
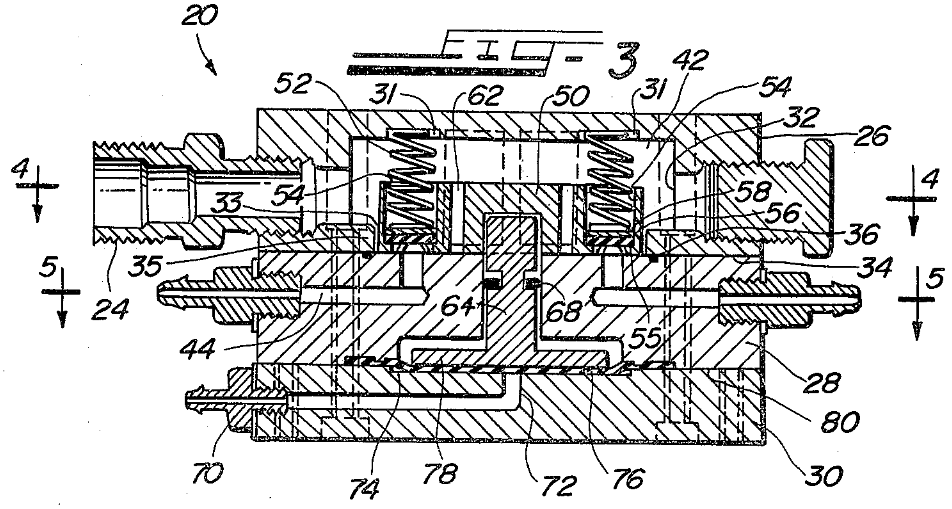
FIG. 3 is a section view of the fluid valve of the present invention shown in the closed position, whereby fluid flow to the outlet lines is interrupted.
Figure 2:
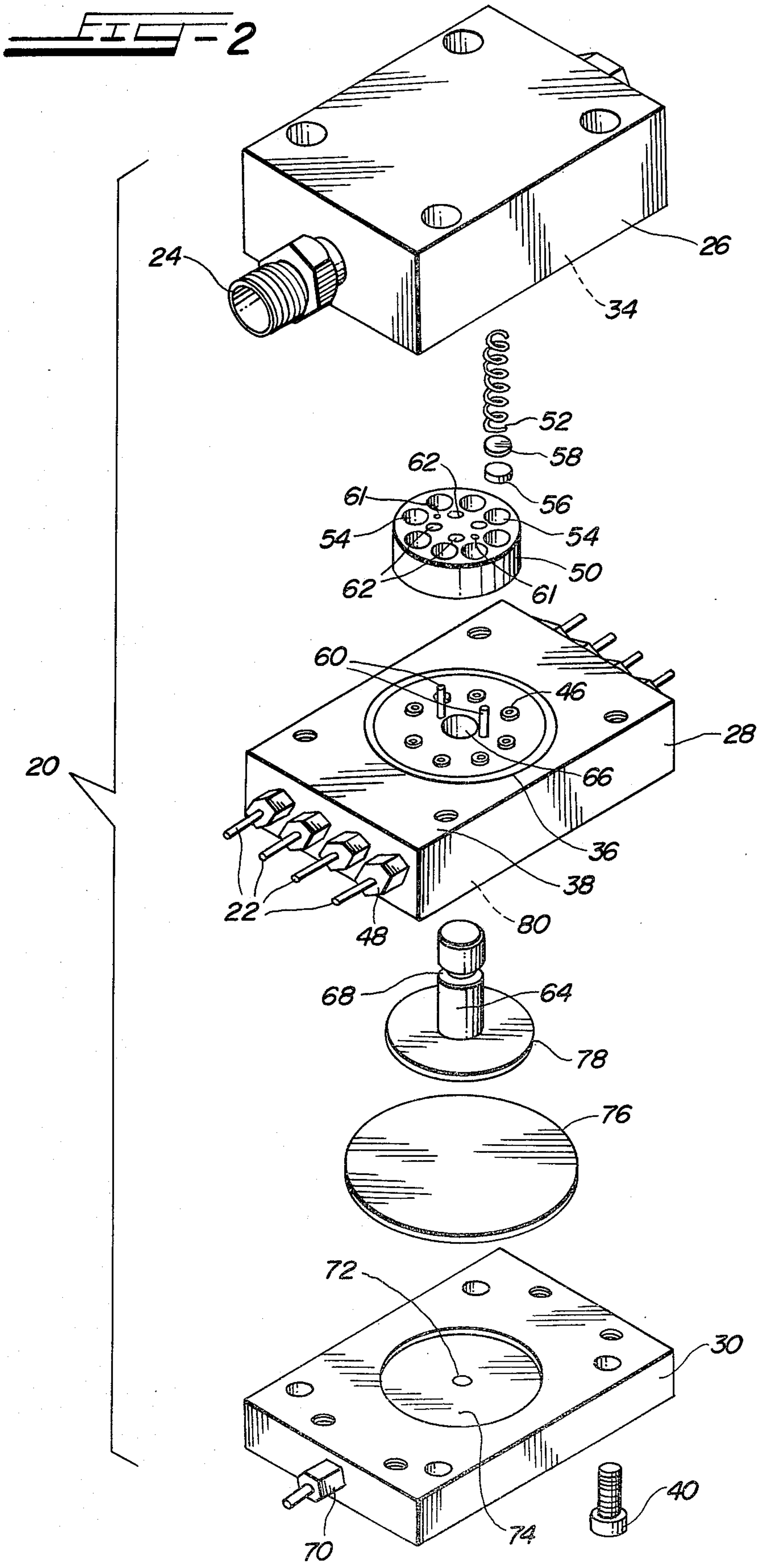
FIG. 2 is an exploded view of the fluid valve in accordance with the present invention.
Figure 4:
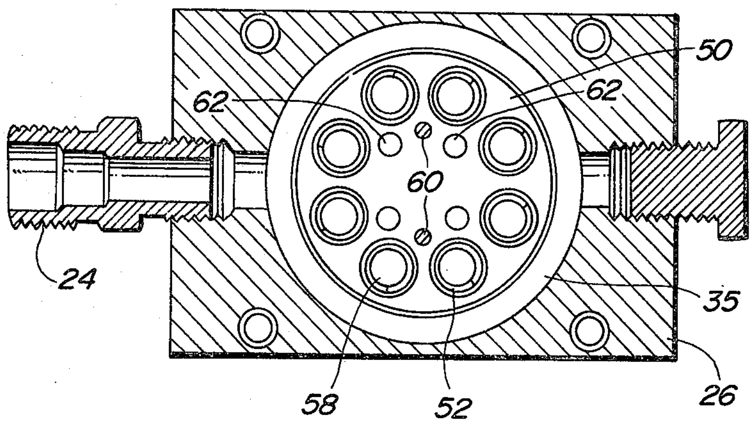
FIG. 4 is a section view taken generally along the line 4—4 of FIG. 3.

As best seen in FIG. 2, the fluid valve of the preferred embodiment includes three components, a valve body 26, a valve manifold 28, and a valve control cover 30. Referring to FIG. 3, the fluid inlet tube fitting 24 of the valve body 26 is in direct communication with a cylindrical chamber 32 in the valve body. The cylindrical chamber is closed at the top of the valve body 26 and opens into a concentric opening 33 on the bottom side 34 of the valve body, the concentric opening 33 being of smaller diameter than the chamber 32 and, hence, defining a lip 35 which is an extension of the bottom side of the valve body. When the fluid delivery system of the invention is assembled, the lip 35 rests on and is secured tightly against an "O"-ring seal 36, which is mounted in an annular channel provided in the top 38 of the valve manifold 28. The valve body 26 is securely fastened to the valve manifold 28 by the use of screws 40 or other suitable fastening means. That portion of the top 38 of the manifold 28 within the "O"-ring 36 acts with the chamber 32 and the concentric opening 33 to define the cylinder 42 of the valve.

Figure 5:
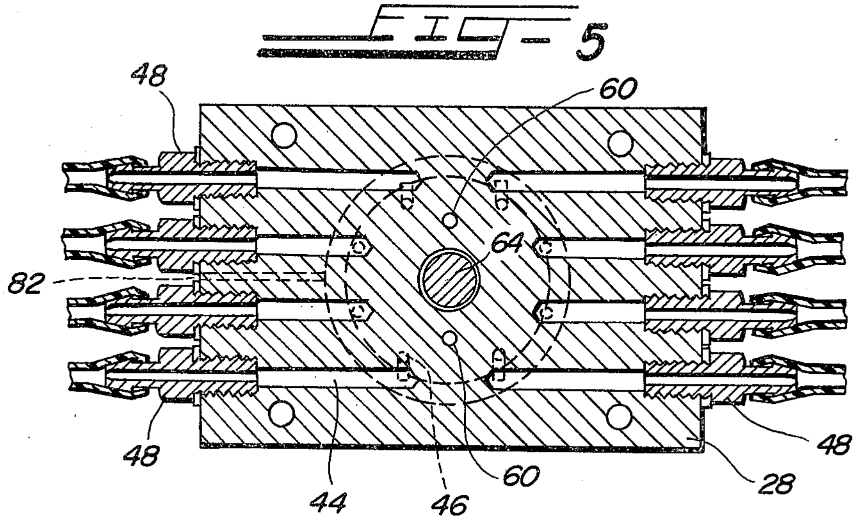
FIG. 5 is a section view taken generally along the line 5—5 of FIG. 3.

As best illustrated in FIG. 5, a plurality of outlet channels 44 communicate with the valve cylinder 42 and apertures 46 in the top 38 of the valve manifold. The outlet channels 44 extend through the manifold 28 to fluid outlet hose fittings 48 or other connecting means attached to the various outlet lines 22.

Valve piston 50 is disposed within the valve cylinder 42 for controlling the flow of fluid from the inlet tube fitting 24 through the outlet lines 22. The valve piston 50 includes a plurality of annularly spaced spring chambers 54, each of which includes a reduced end portion 55 located adjacent to the valve manifold. A seal 56 is disposed in each of the spring chambers 54 and rests on the reduced end portion 55 thereof. The seals 56 may be made of rubber or other effective sealing material. A spring-seat-defining washer 58 is disposed in each chamber and rests on the respective seal 56 for supporting one end of an elongated compression spring 52. The opposite end of the compression spring 52 is received by a complementary spring-seat 31 provided in the closed end of the cylindrical chamber 32 (FIG. 3). The valve piston 50 is continuously urged into closing engagement with apertures 46 by the compression springs 52. In the preferred embodiment each spring 52 and seal 56 is directly above an aperture 46, whereby each seal 56 ensures effective closing of an aperture when the valve piston 50 is in the closed position.

As best seen in FIG. 2, a pair of guide pins 60 project upwardly from the top of the manifold 28 and are received by guide-in-receptive openings 61 in the piston 50. The guide pins 60 maintain the orientation of the piston with the cylinder, thus ensuring that the seals 56 are always disposed in direct communication with the apertures 46 when the piston is in the closed position.

When the valve piston is urged upwardly into an open position (see FIG. 6), and the seals 56 are thereby moved upwardly from the apertures 46, the apertures 46 are in open communication with the fluid supply fitting 24 through the piston channels 62 located within the valve piston 50. Fluid may then flow from cylinder 42 through the piston channels 62 and into the apertures 46. Since seals 56 provide the closure for apertures 46, the piston need not define a seal with the valve cylinder. Therefore, fluid is also permitted to flow between the piston 50 and the lip 35 defining the concentric opening 33. The construction shown ensures even distribution of fluid into apertures 46 and through the various outlet lines 22.

When the piston 50 is in closing engagement with the outlet lines 22, the seals 56 effectively shut the apertures 46. The outlet lines 22 are then open only to the individual spray nozzles 23, thus trapping the fluid in the outlet lines. At shutoff, the outlet lines are open at only one end and are not in communication with one another. Therefore, fluid is entrapped in the outlet lines and dripping does not occur. Hence, when in the closed position the valve piston 50 not only interrupts fluid flow but also precludes dripping.

In the preferred embodiment effective operation of the valve piston is enabled by the use of a single valve plunger 64. The valve plunger is in direct contact with the valve piston 50 via a through orifice 66 provided in the valve manifold 28. An "O"-ring 68 is situated around the valve plunger 64 so that no fluid escapes the fluid valve 20 through the manifold orifice 66. The "O"-ring 68 also prevents air from entering the valve cylinder 42, thus eliminating a potential source of air bubbles.

The valve plunger of the illustrated embodiment is driven by a source of air under pressure. Air enters the valve control cover 30 through an air hose intake fitting 70 and exits the valve control cover through an air supply opening 72 on the surface of an annular recess 74 provided in the top surface of cover 30. An air pressure diaphragm 76 is received by recess 74 and seals the air chamber formed thereby from the rest of the valve assembly. The valve plunger 64 has a face 78 which is perpendicular to the cylindrical axis of the plunger and is adapted for resting against the air pressure diaphragm 76. The valve control cover is securely attached to the valve manifold 28 by screws 40 or other suitable fastening means.

Figure 6:
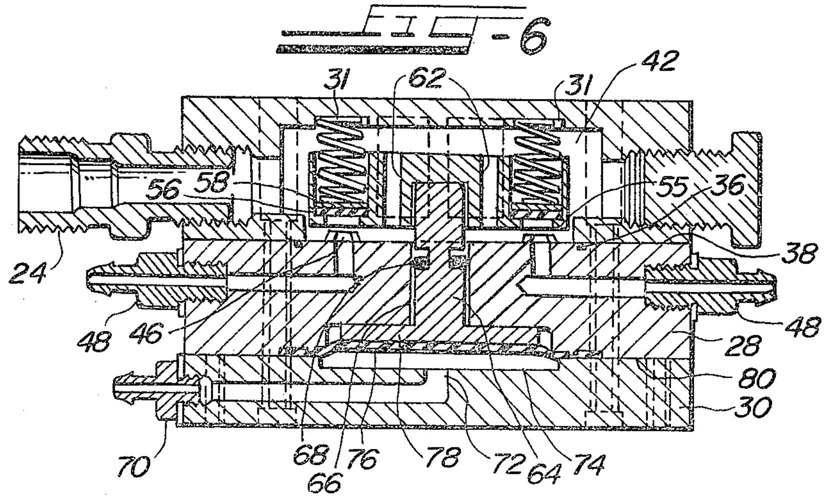
FIG. 6 is a section view of the fluid valve of the present invention shown in the open position, whereby fluid is released under pressure through the outlet lines.

When fluid flow through the outlet lines 22 is desired, the air supply pressure is increased, thereby exerting a force against the air pressure diaphragm 76, which in turn forces the valve plunger 64 upwardly into manifold 2. This pushes the valve piston 50 upwardly from the closed position and compresses the springs 52. Fluid is now free to flow from fluid inlet tube fitting 24 through the cylinder 42 and into apertures 46. When the air supply pressure is decreased, the valve plunger 64 is returned to its retracted position by the valve piston and the diaphragm 76 is relaxed. The valve piston 50 and the seals 56 are returned by the compression springs 52 into closing engagement with the apertures 46. FIGS. 3 and 6 show the valve piston in closed and open positions, respectively.

As seen in FIG. 6, the orifice 66 widens at the valve manifold underside 80, permitting the plunger face 78 to enter the valve manifold 28 so that the valve plunger 64 can freely move the valve piston 50 between its fully retracted and fully extended positions. An air vent 82 (FIG. 5) extends through the valve manifold 28 and communicates with the orifice 66 at its widened portion, providing for escape of air trapped between the valve manifold and valve control cover, thus lessening resistance to movement of the valve plunger 64. Air within the widened end of the orifice 66 is easily displaced through the air vent 82 and precludes any tendency for air trapped within the orifice 66 to cross the plunger "O"-ring 68 into the valve cylinder 42.

It can be seen from the above description that the timing of the non-drip fluid delivery system may be entirely controlled by proper variation of the air supply pressure for the drive means. It should be noted that alternative drive means, such as, by way of example, a solenoid, may also be employed.

While certain features and embodiments of the invention have been described in detail herein, it should be understood that alternatives and modifications may be employed without departing from the scope and spirit of the invention as defined by the appended claims.

What is claimed is:

1. A non-drip fluid delivery system, comprising:

(a) a supply of fluid under pressure;

(b) a plurality of outlet lines;

(c) a single valve means for said plurality of outlet lines for simultaneously interrupting the flow of fluid from said supply to each of the outlet lines, said valve means including a cylinder, and a single piston movable between a first position and a second position in said cylinder, said valve piston including a plurality of seals, each of said seals associated with a corresponding outlet line for effectively closing the associated outlet lines to fluid flow when said valve piston is in said first position, said valve piston when in first position being in simultaneous closing engagement with each of said outlet lines and when in said second position being out of engagement with the outlet lines to permit the flow of fluid from said supply into each of the outlet lines, biasing means associated with said piston and said cylinder for continuously urging said piston into closing engagement with said outlet lines, said biasing means being disposed intermediately of said piston and said cylinder and including a plurality of compression springs in one-to-one correspondence with said seals, said piston further including:

(1) a plurality of spring chambers each having a reduced end portion;

(2) one of said seals resting on the reduced end portion of each spring chamber, each of said seals being in contact with and sealing an associated outlet line when the piston is in the first position;

(3) a washer resting on the seal of each spring chamber for defining one end of the associated compression spring;

(4) said cylinder including a plurality of spring-seats complementary with the chambers in said piston and adapted for receiving and supporting an opposite end of the associated compression spring; and (d) means for selectively moving the piston between its first position and second position for simultaneously opening and closing all of said outlet lines.

2. A non-drip fluid delivery system, comprising:

(a) a supply of fluid under pressure;

(b) a plurality of outlet lines;

(c) a single valve means for said plurality of outlet lines for simultaneously interrupting the flow of fluid from said supply to each of the outlet lines, said valve means including;

(1) a valve body having a top and bottom, a cylindrical chamber therein, said chamber being closed at the top of the body and open at the bottom of the body, and means for introducing the supply of fluid into said chamber;

(2) a valve manifold securely mounted to the bottom of said valve body for closing the open end of the cylindrical chamber and defining therewith a valve cylinder, said manifold including a through orifice in communication with the cylinder, a plurality of outlet channels being disposed in said manifold in communication with said valve cylinder, said channels being in one-to-one corresponding communication with the plurality of outlet lines;

(3) sealing means disposed intermediately of the valve body and valve manifold;

(4) a single piston disposed in said cylinder intermediate of the means for introducing the fluid supply and the outlet channels and movable between a first position and a second position in said cylinder, said valve piston when in first position being in simultaneous closing engagement with each of said outlet lines and when in said second position being out of engagement with the outlet lines to permit the flow of fluid from said supply into each of the outlet lines; and (5) a valve plunger extending through said valve manifold through orifice and positioned for operative engagement with said piston;

(d) valve operating means for selectively moving said piston between its first position and second position for simultaneously opening and closing all of said outlet lines, said valve operating means comprising:

(1) a valve control cover having a recess, and being securely mounted to said valve manifold such that said annular recess faces said valve manifold;

(2) a diaphragm disposed in said annular recess; and (3) means for selectively supplying air under pressure to said diaphragm, the diaphragm being responsive to air pressure applied there against for displacing the valve plunger and moving the valve piston from the first position to the second position.

* * * * *